United States Patent
Brownlie et al.

(10) Patent No.: US 11,242,149 B2
(45) Date of Patent: Feb. 8, 2022

(54) MOVEABLE T-DIVIDER FOR MEAL CART STOWAGE

(71) Applicant: B/E Aerospace, Inc., Winston-Salem, NC (US)

(72) Inventors: Donna C. Brownlie, Northhamptonshire (GB); Venkata Prasanth Suman Neti, Milton Keynes (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 337 days.

(21) Appl. No.: 16/569,263

(22) Filed: Sep. 12, 2019

(65) Prior Publication Data

US 2021/0078708 A1  Mar. 18, 2021

(51) Int. Cl.
*B64D 11/04*  (2006.01)
*B64D 11/00*  (2006.01)

(52) U.S. Cl.
CPC .......... *B64D 11/04* (2013.01); *B64D 11/0007* (2013.01)

(58) Field of Classification Search
CPC ....... A47B 53/02; A47B 31/06; A47B 23/041; B64D 2013/0629; B60N 3/001
See application file for complete search history.

(56) References Cited

U.S. PATENT DOCUMENTS

| | | | | |
|---|---|---|---|---|
| 4,469,382 A | * | 9/1984 | Slaats | E05B 65/46 312/219 |
| 6,032,588 A | * | 3/2000 | Williamson | A47B 1/04 108/66 |
| 6,209,977 B1 | * | 4/2001 | Vondrejs | A47B 85/08 312/249.9 |
| 6,688,708 B1 | * | 2/2004 | Janson | A47B 53/02 312/200 |
| 8,707,864 B2 | * | 4/2014 | Fritz | B30B 9/3057 100/35 |
| 2005/0280340 A1 | * | 12/2005 | Brustle | A47B 88/944 312/348.4 |
| 2010/0307350 A1 | * | 12/2010 | Cunningham | B30B 9/3075 100/35 |
| 2017/0341670 A1 | * | 11/2017 | Gonnsen | B64D 11/04 |
| 2018/0208314 A1 | * | 7/2018 | Heidtmann | B64D 11/0007 |
| 2019/0031348 A1 | * | 1/2019 | Bajorat | B64D 9/00 |
| 2021/0155347 A1 | * | 5/2021 | Burd | B60B 33/04 |

\* cited by examiner

*Primary Examiner* — Joshua J Michener
*Assistant Examiner* — Cindi M Curry
(74) *Attorney, Agent, or Firm* — Suiter Swantz pc llo

(57) ABSTRACT

A T-divider secures meal carts against lateral movement, and is at least partially deflectable to allow the meal carts to be removed from a restricted environment. The T-divider is secured in linear orientation via a latch with one or more indicators; one indicator indicates if the latch is locked; another indicator indicates if the T-divider is secured. The movement of the T-divider is defined by a track. One or more stops on the track define a linear, secured orientation and a fully deflected orientation.

15 Claims, 8 Drawing Sheets

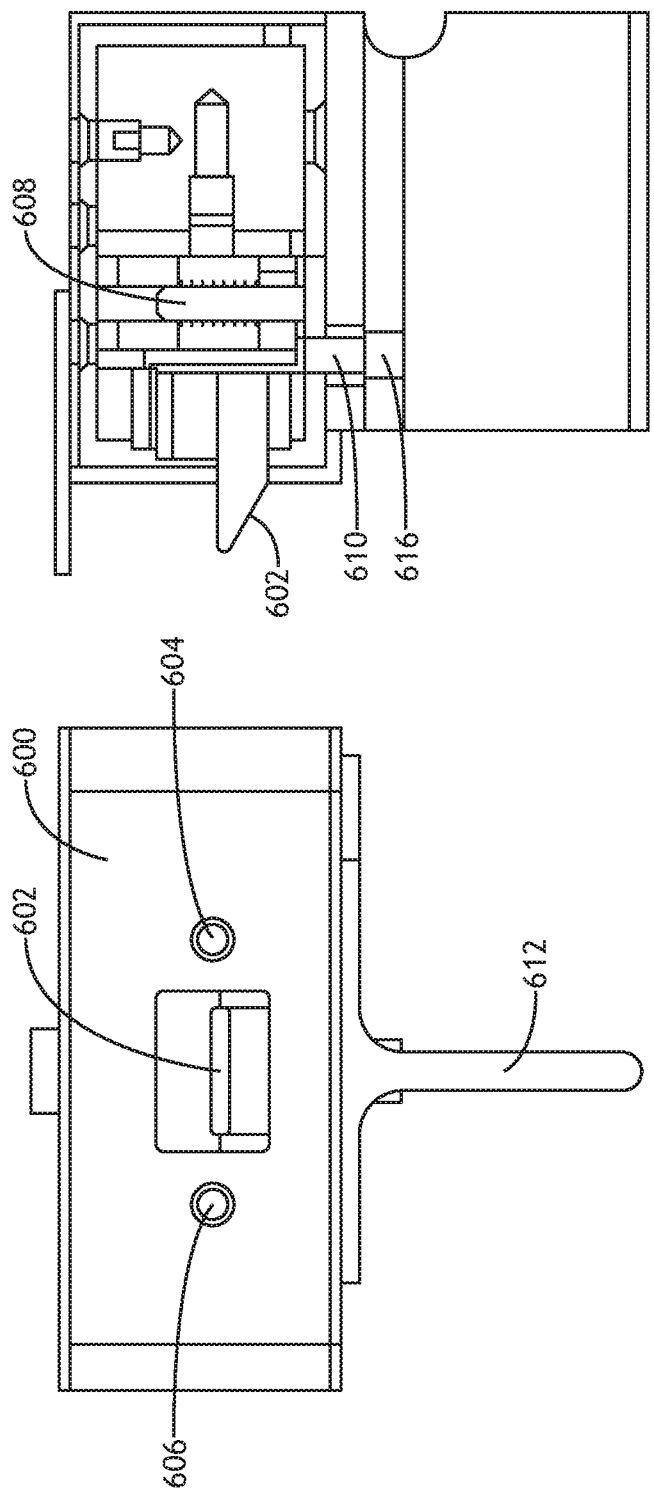

MOVEABLE T-DIVIDER FOR MEAL CART STOWAGE

BACKGROUND

In commercial passenger aircraft galleys, maximizing cart stowage is a key requirement for airlines, especially if they operate long haul services. Where a galley is located in an aircraft access door area, the structure of the door including the door bustle can project into the space available for accessing the galley carts, rendering the innermost bay unusable when the door is closed during flight.

If a door facing galley has a single cart bay on its innermost side (adjacent to the fuselage) it is impossible to extract a half-size let alone full-size meal service cart from the bay. If a double bay is used, a fixed aluminum rail called a T-divider is required to restrain the carts against side loads.

SUMMARY

In one aspect, embodiments of the inventive concepts disclosed herein are directed to a T-divider that secures meal carts against lateral movement, and is at least partially deflectable to allow the meal carts to be removed from a restricted environment.

In a further aspect, the T-divider is secured in linear orientation via a latch. The latch includes one or more indicators. One indicator indicates if the latch is locked; another indicator indicates if the T-divider is secured.

In a further aspect, the movement of the T-divider is defined by a track or rail. One or more stops on the track define a linear, secured orientation and a fully deflected orientation.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 6A shows front and side views of a latch mechanism according to one exemplary embodiment;

DETAILED DESCRIPTION

Figure 1:
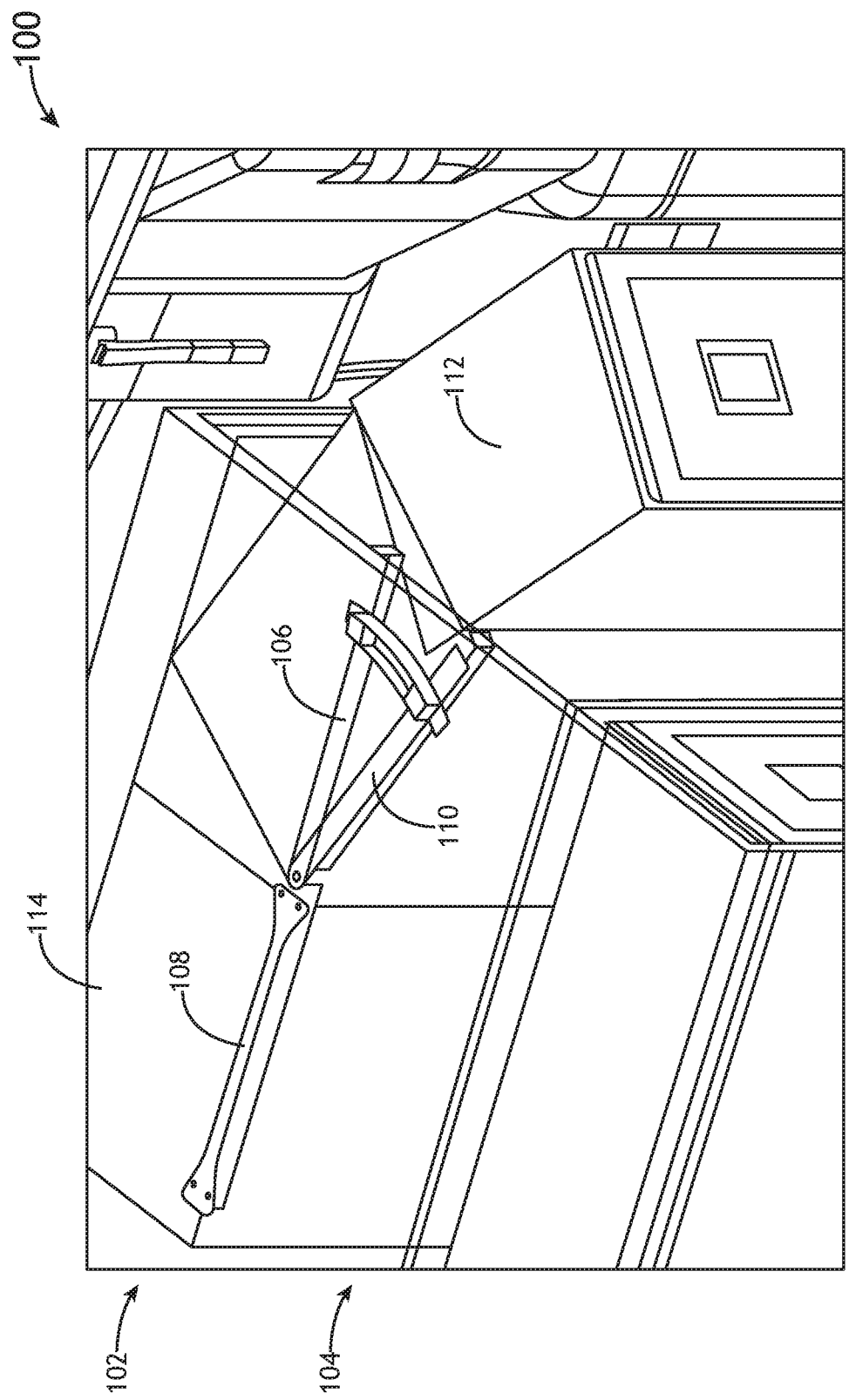
FIG. 1 shows an environmental view of meal cart stowage bays including one exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to T-divider that secures meal carts against lateral movement, and is at least partially deflectable to allow the meal carts to be removed from a restricted environment.

Referring to FIG. 1, an environmental view of meal cart stowage bays including one exemplary embodiment is shown. A galley 100 having a plurality of cart storage bays 102, 104 may be in an area restricted by surrounding aircraft structures such as a door bustle. The cart stowage bays 102, 104 are partially defined by T-dividers 106, 108, 110 that restrict lateral movement of carts 112, 114 within the corresponding cart stowage bays 102, 104. In one embodiment, a restricted cart stowage bay 102 configured to house two half-size carts 112, 114 is defined by a moveable T-divider with a fixed portion 108 defining a distal portion of a boundary between the restricted cart stowage bay 102 and an unrestricted cart stowage bay 104. A proximal portion of the boundary is defined by moveable portion 106, 110 of the moveable T-divider 106, 108, 110. The moveable portion 106, 110 may be in a stowed orientation 106 wherein the half-size carts 102, 104 are retained within the restricted stowage bay 102 and the unrestricted stowage bay 104 is accessible for additional cart stowage.

In at least one embodiment, where carts are removed from the unrestricted cart bay 104, the movable portion 106, 110 may be placed in a removal orientation 110 where the half-size carts 112, 114 can be removed around the surrounding aircraft structure. In such embodiment, the unrestricted stowage bay 104 may accommodate two half-size carts and only a proximal cart needs to be removed to accommodate the removal orientation 110.

In at least one embodiment, the moveable T-divider 106, 108, 110 may comprise a single element defining the entire boundary between the restricted stowage bay 102 and the unrestricted stowage bay 104 to accommodate full-size carts. In such embodiment, the unrestricted stowage bay 104 should be completely vacated so that the single T-divider 106, 108, 110 may deflect sufficiently to allow a full-size cart to be removed from the restricted stowage bay 102.

Figure 2:
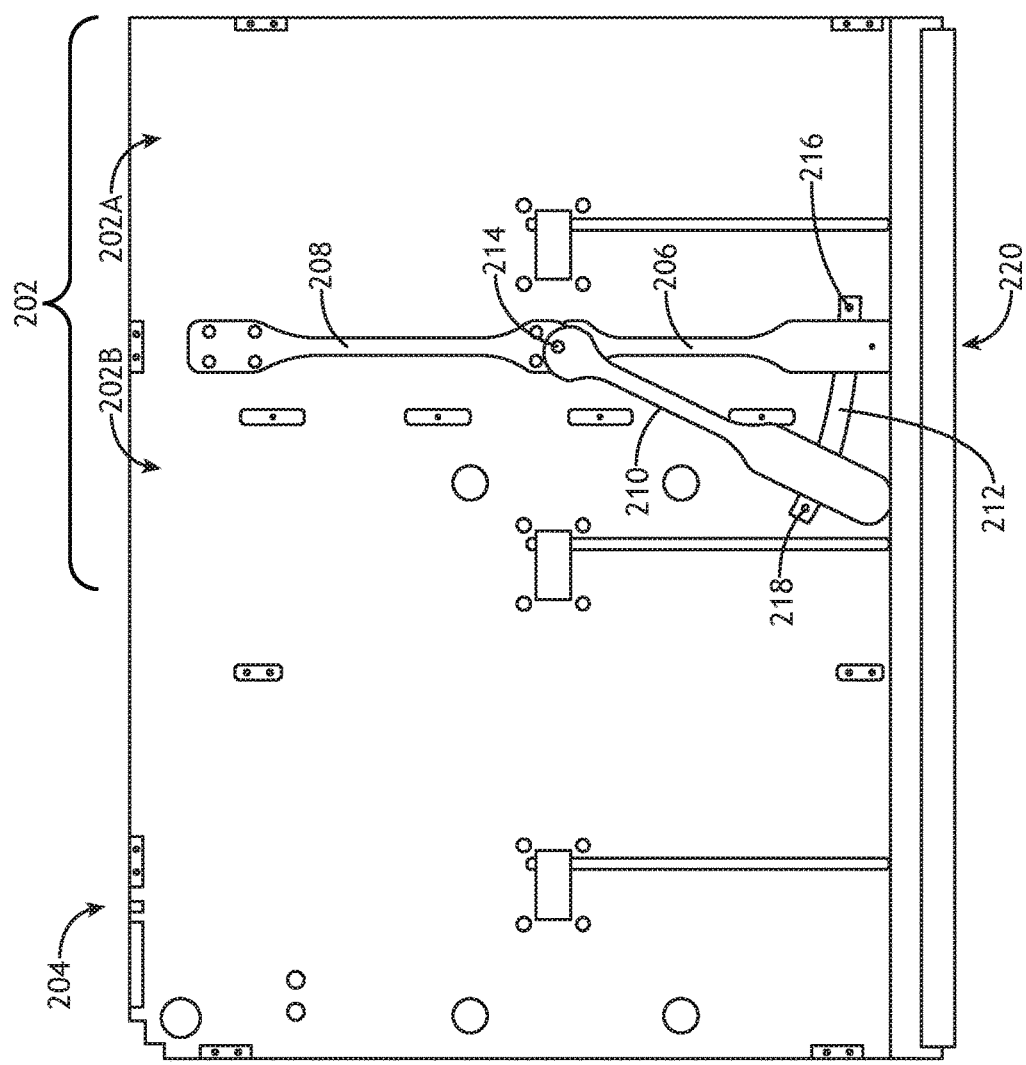
FIG. 2 shows a top view environmental of meal cart stowage bays including one exemplary embodiment.

Referring to FIG. 2, a top view environmental of meal cart stowage bays 202, 204 including one exemplary embodiment is shown. A galley 200 having at least one double cart stowage bay 202 (and potentially one or more single cart stowage bays 204) includes a T-divider 206, 208, 210 defining a boundary between a first bay 202A of the double cart stowage bay 202 and a second bay 202B of the double cart stowage bay 202. The first bay 202A may be restricted by surrounding aircraft structures; to facilitate removal of a cart during flight, a moveable portion 206, 210 of the T-divider 206, 208, 210 may be deflected from a stowed orientation 206 to a removal orientation 210. In the stowed orientation 206, the movable portion 206, 210 is linearly aligned with a fixed portion 208 to restrict lateral movement of carts stowed in the first bay 202A and second bay 202B. In the removal orientation 210, a half-size cart in a proximal portion of the first bay 202A is free to rotate sufficiently to bypass the obstructions caused by the surrounding aircraft structure.

In at least one embodiment, the movement of the moveable portion 206, 210 is defined by a divider track 212 or rail. The arc of the divider track 212 may be defined by the length of the moveable portion 206, 210 between the divider track 212 and a pivot point 214 between the moveable portion 206, 210 and the fixed portion 208. The deflection of the moveable portion 206, 210 may be restricted via one or more track stops 216, 218. A stowed track stop 216 stops the moveable portion 206, 210 when it is in a stowed orientation 206 in line with the fixed portion 208. Likewise, a removal track stop 218 stops the moveable portion 206, 210 when it is in a removal orientation 210.

The moveable portion 206, 210 may be secured in the stowed orientation 206 via one or more latch mechanisms 220. In at least one embodiment, the galley 200 may comprise both a top-mounted moveable T-divider 206, 208, 210 and a floor-mounted moveable T-divider 206, 208, 210. Such floor-mounted moveable T-divider 206, 208, 210 may include all of the features of the corresponding top-mounted moveable T-divider 206, 208, 210, including a separate latch mechanism 220.

Figure 3:
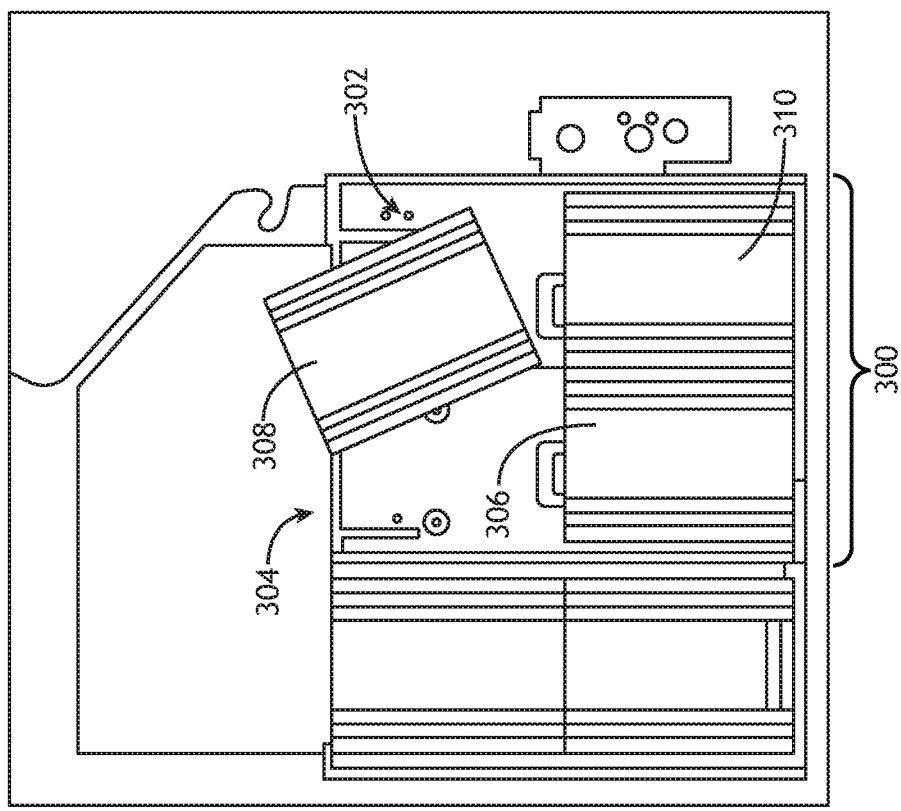
FIG. 3 shows a top view environmental of meal cart stowage bays including one exemplary embodiment.

Referring to FIG. 3, a top view environmental of meal cart stowage bays 300, 302 including one exemplary embodiment is shown. Where a double cart stowage bay 300 (a stowage bay for storing carts side-by-side without a solid divider between them) includes a first bay 302 that is obstructed at least some of the time during normal operation, and a second bay 304 that is generally unobstructed. In at least one embodiment, a half cart in a proximal or forward position in the second bay 304 is removed. In at least one embodiment, a latch mechanism holding a moveable portion of at least one moveable T-divider in a linear, stowed orientation is disengaged, and the moveable portion of the moveable T-divider that separates the first bay 302 from the second bay 304 is deflected into the second bay 304. Where another floor mounted moveable T-divider separates the first bay 302 and the second bay 304, a second latch mechanism may be disengaged to allow the moveable portion of the floor mounted moveable T-divider to deflect into the second bay 304. A proximal half cart 308 in the forward position of the first bay 302 may then be removed from the first bay 302, around the obstruction. After the proximal half cart 308 is remove, a distal half cart 310 in the rear position may also b removed around the obstruction.

Figure 4:
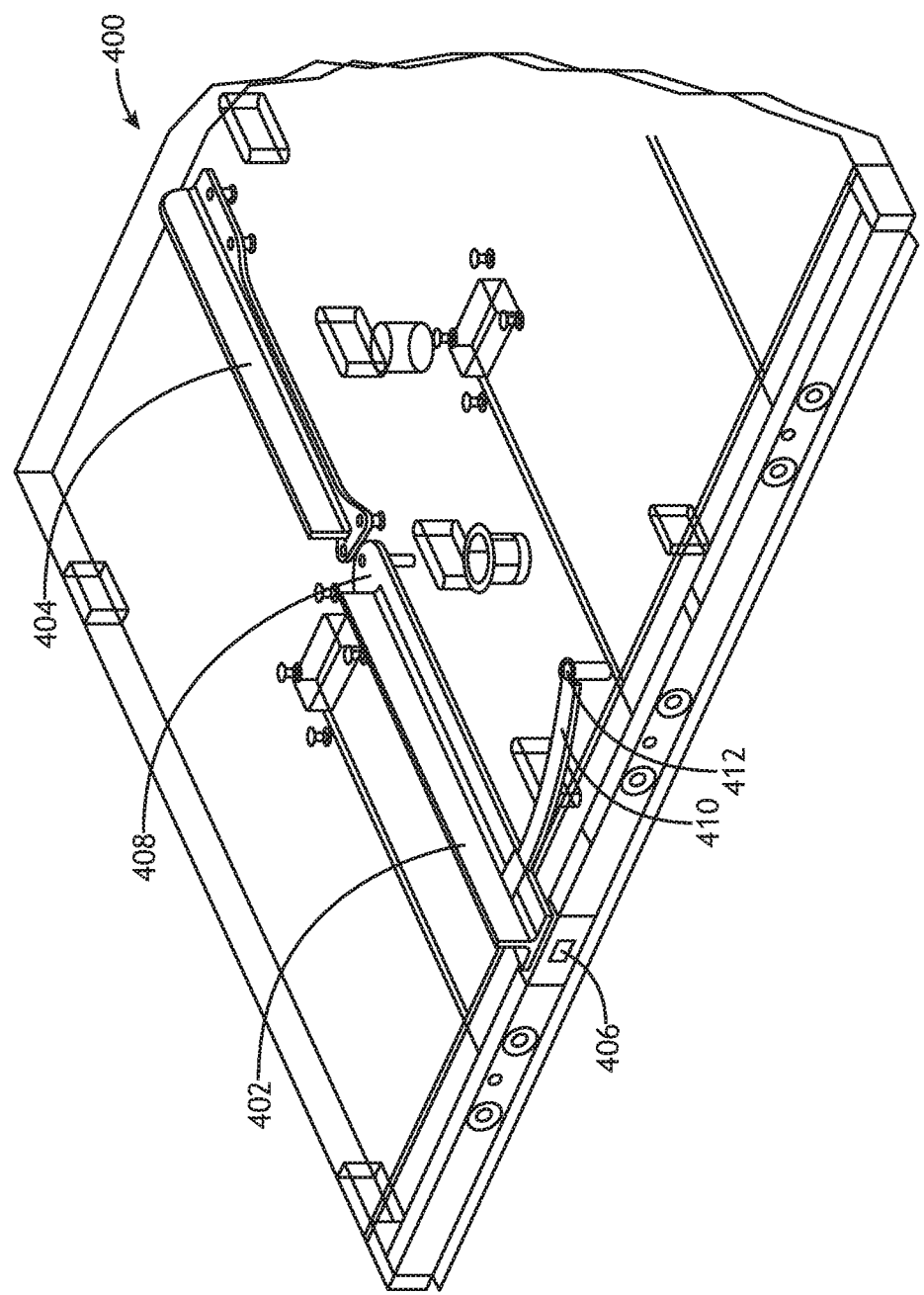
FIG. 4 shows a perspective view of a bottom surface of cart bay including one exemplary embodiment.

Referring to FIG. 4, a perspective view of a bottom surface of a cart bay including one exemplary embodiment is shown. A double stowage bay 400 may include a moveable T-divider 402, 404. A latch mechanism 406 secures a moveable portion 402 of the moveable T-divider 402, 404 in a stowed orientation. When the latch mechanism 406 is disengaged, the moveable portion 402 is deflected about a pivot point 408 otherwise proximal to a fixed portion 404 of the moveable T-divider 402, 404. A divider track 410 supports a proximal end of the moveable portion 402 and defines the movement of the moveable portion 402. The divider track 410 may include one or more stops 412 to define the maximum deflection of the moveable portion 402. The maximum deflection should be sufficient to allow a half-size cart to be removed from an obstructed bay of the double stowage bay 400.

Figure 5:
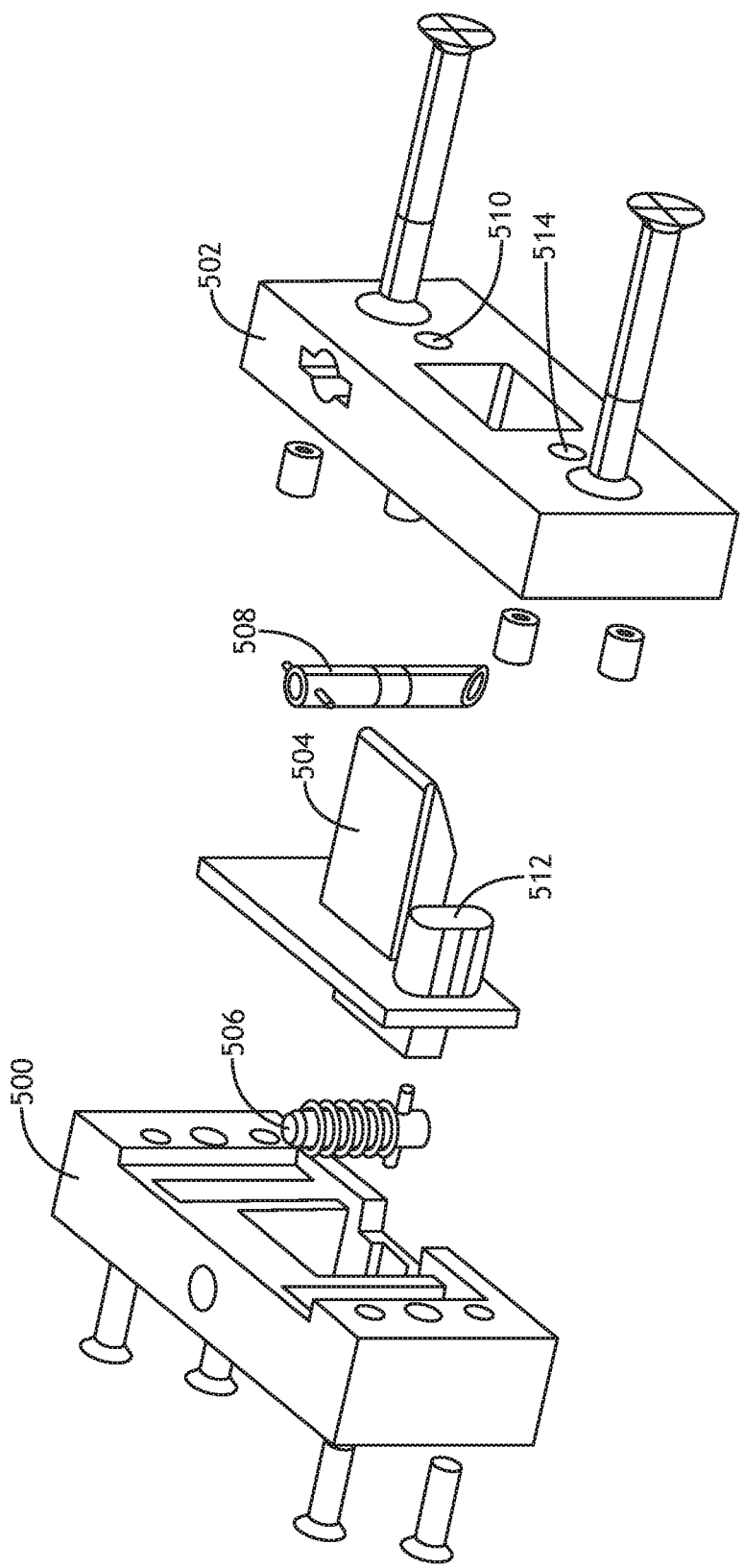
FIG. 5 shows an exploded view of a latch mechanism according to one exemplary embodiment.

Referring to FIG. 5, an exploded view of a latch mechanism according to one exemplary embodiment is shown. A latch mechanism, suitable for use with a moveable T-divider, includes a latch block having a rear component 500 and a front component 502, a latch handle 504 including or connected to a latch striker that engages a portion of a moveable T-divider, and a biasing element 506 such as a spring or other suitable linear actuator to generally bias the latch handle into an engaged orientation.

In at least one embodiment, the latch mechanism includes a latch state indicator 508. The latch state indicator 508 may include color-coded portions observable via a latch indicator window 510 defined by the front component 502. For example, when a corresponding moveable T-divider is in a stowed orientation and latched, the latch state indicator 508 may protrude into a corresponding space in the moveable T-divider so that a green section of the latch state indicator 508 is visible through the latch indicator window 510; alternatively, when the moveable T-divider is not latched, the latch state indicator 508 either abuts a surface of the moveable T-divider so as to be held inside the latch mechanism, or protrudes further into a space previously occupied by the moveable T-divider, such that one of one or more red sections of the latch state indicator 508 is visible through the latch indicator window 510.

In at least one embodiment, the latch mechanism includes a latch lock indicator 512 disposed on the latch handle 504. The latch lock indicator 512 may include color-coded portions observable via a latch lock window 514 defined by the front component 502. For example, when the latch handle 504 is in an engaged orientation, a green section of the latch lock indicator 512 is visible through the latch lock window 514; alternatively, when the latch handle 504 is in a disengaged orientation, a red section of the latch lock indicator 512 is visible through the latch lock window 514.

Figure 6B:
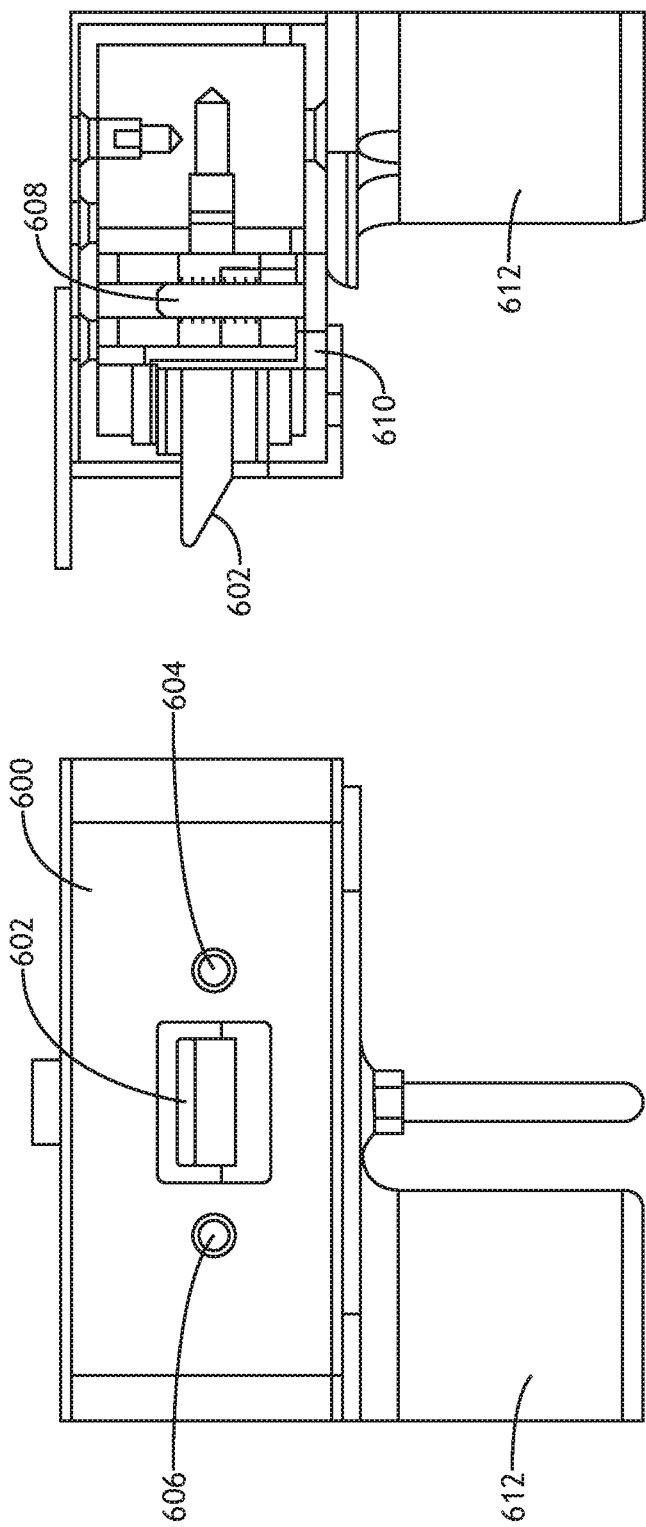
FIG. 6B shows front and side views of a latch mechanism according to one exemplary embodiment.

Referring to FIGS. 6A and 6B, front and side views of a latch mechanism 600 according to one exemplary embodiment are shown. Where a moveable T-divider 612, 614 is in a stowed orientation (as in FIG. 6A), a moveable portion 612 of the moveable T-divider 612, 614 is linearly aligned with a fixed portion 614. A latch striker 610 connected to a latch handle 602 engages a latch recess 616 defined by the moveable portion 612. A latch lock indicator 606 disposed on the latch handle 602 is visible through a latch lock window to indicate if the latch handle 602 is oriented such that the latch striker 610 could engage the latch recess 616. Furthermore, a latch state indicator 604 is visible through a latch indicator window. Where the moveable portion 612 is in the stowed orientation, the latch state indicator 604 engages the movable portion 612 such that a green section of the latch state indicator 604 is visible.

In at least one embodiment, where a moveable T-divider 612, 614 is in a removal orientation (as in FIG. 6B), a moveable portion 612 of the moveable T-divider 612, 614 is deflected from the fixed portion 614. The latch striker 610 is disengaged from the latch recess 616. While the latch handle is held in a disengaged orientation, the latch lock indicator 606 indicates the latch handle 602 is oriented such that the latch striker 610 could not engage the latch recess 616. Furthermore, the latch state indicator 604 is either too high within the latch mechanism 600 or protrudes too far such that a red section of the latch state indicator 604 is visible. It may be appreciated that when the latch handle 602 is released and biased back toward a locked orientation, but the moveable portion 612 is no longer in the stowed orientation, the latch lock indicator 606 may show the green indicator but the latch state indicator 604 may still show the red indicator.

Figure 7:
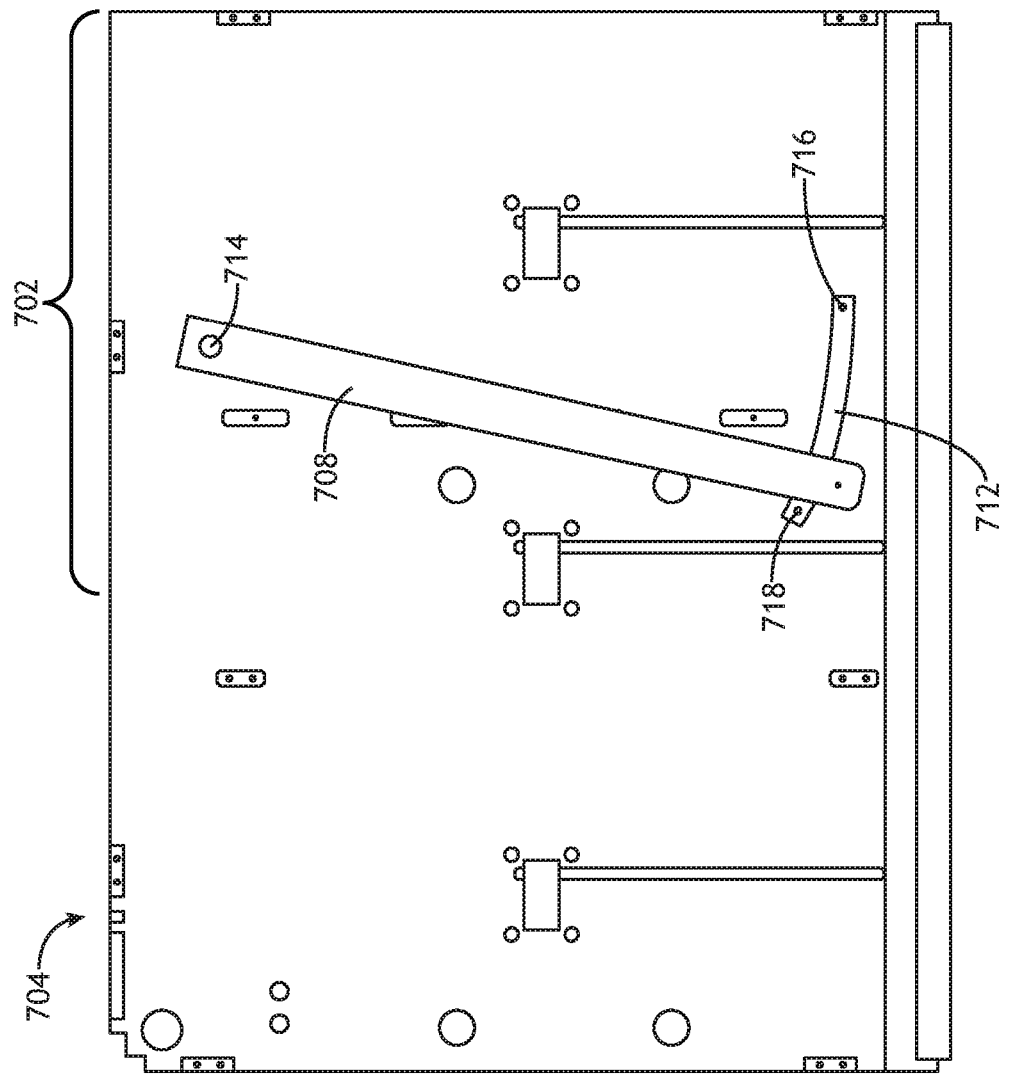
FIG. 7 shows a top view environmental of meal cart stowage bays including one exemplary embodiment

Referring to FIG. 7, a top view environmental of meal cart stowage bays 702, 704 including one exemplary embodiment is shown. A galley having at least one double cart stowage bay 702 (and potentially one or more single cart stowage bays 704) includes a moveable T-divider 708 defining a boundary between bays of the double cart stowage bay 702. To facilitate removal of a cart during flight, a moveable T-divider 708 may be deflected from a stowed orientation a removal orientation. In the stowed orientation, the movable T-divider 208 restricts lateral movement of carts stowed in the double bay 702. In the removal orientation, a full-size cart is free to rotate sufficiently to bypass obstructions caused by the surrounding aircraft structure.

In at least one embodiment, the movement of the moveable T-divider 708 is defined by a divider track 712 or rail. The arc of the divider track 712 may be defined by the length of the moveable T-divider 708 between the divider track 712 and a pivot point 714. The deflection of the moveable T-divider 708 may be restricted via one or more track stops 716, 718. A stowed track stop 716 stops the moveable T-divider 708 when it is in a stowed orientation. Likewise, a removal track stop 718 stops the moveable T-divider 708 when it is in a removal orientation.

The moveable T-divider 708 may be secured in the stowed orientation via one or more latch mechanisms.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A moveable T-divider comprising:
   a fixed portion disposed on an upper, interior surface of a double cart bay;
   a moveable portion disposed on the upper, interior surface of the double cart bay, the moveable portion deflectable from a stowed orientation to a removal orientation; and
   a pivot element pivotably connecting the moveable portion to the upper, interior surface at a point proximal to the fixed portion,
   wherein the moveable T-divider:
      restricts lateral movement of one or more carts in the double cart bay when the moveable portion is in a stowed orientation; and
      allows the one or more carts to be removed from the double cart bay around an obstruction when in a removal orientation.

2. The moveable T-divider of claim 1, further comprising a track disposed on the upper, interior surface of the double cart bay, the track defining a path of deflection of the moveable portion.

3. The moveable T-divider of claim 1, wherein the track further comprises a stowed track stop that stops the moveable portion when in the stowed orientation and a removal track stop that stops the moveable portion when in the removal orientation.

4. The moveable T-divider of claim 1, further comprising a latch mechanism that retains the moveable portion in the stowed orientation.

5. The moveable T-divider of claim 4, wherein the latch mechanism includes a first indicator having a latched state indicating the moveable T-divider is latched and an unlatched state indicating the moveable T-divider is unlatched.

6. The moveable T-divider of claim 5, wherein the latch mechanism includes a second indicator having a secured state indicating the latch mechanism is secured and an unsecured state indicating the latch mechanism is unsecured.

7. The moveable T-divider of claim 6, wherein the latch mechanism requires a first hand to operate the latch mechanism and a second hand to deflect the movable T-divider.

8. The moveable T-divider of claim 7, wherein the latch mechanism latches automatically when the movable T-divider is in a stowed orientation.

9. An aircraft galley comprising:
   a double cart bay having a top-mounted moveable T-divider comprising:
      a fixed portion disposed on an upper, interior surface of the double cart bay;
      a moveable portion disposed on the upper, interior surface of the double cart bay, the moveable portion deflectable from a stowed orientation to a removal orientation; and a pivot element pivotably connecting the moveable portion to the upper, interior surface at a point proximal to the fixed portion, wherein the moveable T-divider:

restricts lateral movement of one or more carts in the double cart bay when the moveable portion is in a stowed orientation; and allows the one or more carts to be removed from the double cart bay around an obstruction when in a removal orientation.

10. The aircraft galley of claim 9, further comprising a track disposed on the upper, interior surface of the double cart bay, the track defining a path of deflection of the moveable portion.

11. The aircraft galley of claim 9, wherein the track further comprises a stowed track stop that stops the moveable portion when in the stowed orientation and a removal track stop that stops the moveable portion when in the removal orientation.

12. The aircraft galley of claim 9, wherein:

the latch mechanism requires a first hand to operate the latch mechanism and a second hand to deflect the movable T-divider; and the latch mechanism latches automatically when the movable T-divider is in a stowed orientation.

13. The aircraft galley of claim 9, further comprising a latch mechanism that retains the moveable portion in the stowed orientation.

14. The aircraft galley of claim 13, wherein the latch mechanism includes a first indicator having a latched state indicating the aircraft is latched and an unlatched state indicating the aircraft is unlatched.

15. The aircraft galley of claim 14, wherein the latch mechanism includes a second indicator having a secured state indicating the latch mechanism is secured and an unsecured state indicating the latch mechanism is unsecured.

* * * * *